United States Patent [19]

Kattner et al.

[11] 4,250,512

[45] Feb. 10, 1981

[54] HEATING DEVICE FOR RECORDING HEADS IN INK MOSAIC RECORDERS

[75] Inventors: Erich Kattner; Guetner Rosenstock; Hans Kern, all of Munich, Fed. Rep. of Germany

[73] Assignee: Siemens Aktiengesellschaft, Berlin & Munich, Fed. Rep. of Germany

[21] Appl. No.: 75,422

[22] Filed: Sep. 14, 1979

Related U.S. Application Data

[63] Continuation of Ser. No. 865,178, Dec. 28, 1977.

[30] Foreign Application Priority Data

Dec. 29, 1976 [DE] Fed. Rep. of Germany ....... 2659398

[51] Int. Cl.[3] ............................................ G01D 15/16

[52] U.S. Cl. ................................ 346/140 R; 219/216

[58] Field of Search .......................... 346/140 PD, 75; 219/216

[56] References Cited

U.S. PATENT DOCUMENTS

| | | | |
|---|---|---|---|
| 3,790,703 | 2/1974 | Carley | 346/140 X |
| 3,999,190 | 12/1976 | Brown | 346/140 |
| 4,007,684 | 2/1977 | Takano | 346/140 X |
| 4,158,847 | 6/1979 | Heinzl | 346/140 |

OTHER PUBLICATIONS

Ruddy, G. A. Viscosity Control Circuit; IBM Teca. Disc. Bulletin, vol. 16, No. 10, March 1974, p. 3295.

Buehner et al., Two-Level Ink Jet Deflection Control System, IBM Tech. Disc. Bulletin, vol. 16, No. 10, Mar. 1974, pp. 3308–3309.

*Primary Examiner*—Joseph W. Hartary

*Attorney, Agent, or Firm*—Hill, Van Santen, Steadman, Chiara & Simpson

[57] ABSTRACT

A heating device for recording heads of ink mosaic recorders, for maintaining the ink therefrom at an optimum temperature at time of discharge from the head. Means are provided for supplying heat to the head directly at the discharge orifices thereof. The device is further provided with control means, including temperature sensing means, for maintaining the temperature of the ink constant. Means are also provided for preventing operation of the recording head unless the ink is at its nominal operating temperature.

9 Claims, 3 Drawing Figures

HEATING DEVICE FOR RECORDING HEADS IN INK MOSAIC RECORDERS

This is a continuation of application Ser. No. 865,178, filed Dec. 28, 1977.

BACKGROUND OF THE INVENTION

The invention relates to a device for heating the recording fluid in a recording head, of an ink mosaic recorder, which head contains a plurality of ink discharge orifices.

In ink mosaic recorders the recording fluid is fed from a reservoir through a delivery duct to a recording head, with the latter, in dependence upon the mosaic screen employed, containing a plurality of individual ink ducts which are individually surrounded by respective piezoelectric control elements. In the recording operation such piezoelectric control elements contract in synchronism with an image generator, to thereby discharge, out of the individual ink ducts, individual droplets of ink which are deposited on the recording medium or carrier.

The quality of reproduction obtainable from such an ink mosaic recorder is materially dependent, among other things, upon the viscosity of the recording fluid. If the latter is of low viscosity, the formation of droplets is made more difficult and it is possible for double droplets to be forced out of the orifices of the ink ducts, considerably impairing the recorded image. If the viscosity of the recording fluid is increased, the droplet formation is improved with a corresponding improvement in the recorded image. On the other hand, such an increase in viscosity has the disadvantage that variations in temperature, particularly within the range of normal room temperature, have themselves a very marked effect upon the viscosity. Consequently, in order to obtain a uniform image reproduction, which is independent of temperature, it is necessary to maintain the viscosity, as far as possible, uniform over a wide temperature range.

An arrangement is known, from German Inspection Specification No. 2,433,510 in which an intermediate chamber between the ink outlet and the ink reservoir has incorporated therewith a heating arrangement for warming the ink up to a temperature above the ambient temperature. in this disclosure, the heating arrangement is utilized primarily for the removal of gas from the recording fluid and to ensure that the recording ink, as a result of the increased temperature thereof, will rapidly become wipe or smear resistant on the recording medium or carrier.

BRIEF SUMMARY OF THE INVENTION

The present invention therefore has, among its objectives, the production of a device, for an ink mosaic recorder, which will ensure recording with uniform reproduction quality over a wide temperature range.

This objective is achieved, in accordance with the invention, by the utilization of a heating device, suitably regulated by means of a circuit arrangement, in which the heating means is disposed in the vicinity of the outlet orifices of the ink ducts. In a particularly advantageous embodiment of the invention, a heat-conducting plate of suitable heat-conductive material surrounds all of the outlet orifices of the respective ink ducts, with the heat-conducting plate having incorporated therewith a heating element and a sensing device for monitoring the temperature of the heating element.

In a further advantageous embodiment of the invention, the circuit arrangement also includes a further circuit for preventing the operation of the recording head until the latter has reached its nominal operating temperature.

A device in accordance with the invention thus makes it possible in a relatively simple manner to maintain the viscosity, and thus the image quality, uniform over a wide operational range, and as the heating element is disposed in the immediate vicinity of the outlet orifices of the respective ink ducts, only a very small quantity of ink is required to be warmed up at any one time, whereby the heating operation can be effected very rapidly. As a result of this arrangement preheating operations, which would otherwise be necessary, can be eliminated and the heating device can very rapidly follow temperature fluctuations, even if they likewise occur very rapidly.

Especially efficient operating reliability is schieved through the provision of a circuit which prevents the recording head from being operated prior to its having reached its nominal operating temperature.

BRIEF DESCRIPTION OF THE DRAWINGS

In the drawing, wherein like reference characters indicate like or corresponding parts.

DETAILED DESCRIPTION OF THE INVENTION

Figure 1:
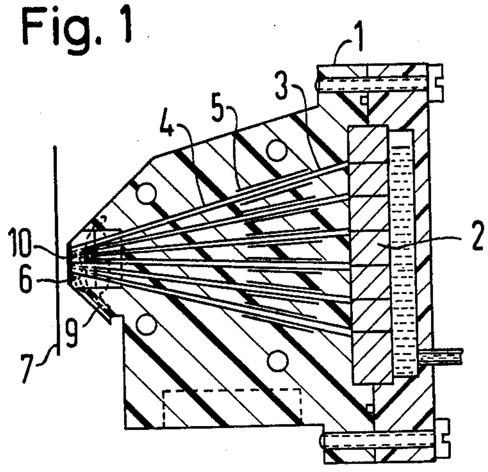
FIG. 1 is a semidiagrammatic sectional view through an ink mosaic recording head incorporating the present invention.

Referring to the drawings and more particularly to FIG. 1, the reference numeral 1 indicates generally a mosaic ink recording head for an ink mosaic recorder in which ink is supplied from a reservoir, not illustrated, over a suitable distributing and constricting arrangement 2 to the actual ink outlets 3, each of which comprises an ink duct 4, which is suitably disposed to produce a desired mosaic configuration, and are encircled, for a portion of their length, by respective tubular piezo-electric elements 5. In the recording operation, upon excitation of such piezo-electric elements, which is effected by suitable actuating means not illustrated, the piezoelectric elements contract and the resultant shock wave forces individual droplets through discharge orifices in an outlet plate 6, with the droplets being deposited on a suitable recording medium or carrier 7.

Figure 2:
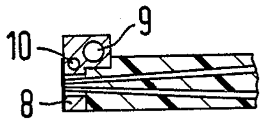
FIG. 2 is an enlarged sectional view of a recording head such as illustrated in FIG. 1 showing the details of construction.

In order to equalize the increase in viscosity of the ink, occurring at low remperatures, and thus ensure that the recording device, as a whole, operates reliably, a heating arrangement is disposed in the vicinity of the outlet orifices of the ducts 4. In the heating arrangement illustrated, a heating-conducting plate 8 is provided which, as illustrated in FIG. 2, surrounds the outlet orifices of the ink ducts 4. The plate 8 also carries a heating element 9 in the form of an electrical resistance and a thermistor 10 which functions as a heat sensor. Advantageously, as illustrated in FIG. 2, the heating arrangement is disposed directly by the outlet orifices of the ink ducts 4 as the greatest pressure losses there occur as the ink flows through the narrow passages. In addition, as the mass of ink and thus its thermal capacity are extraordinarily low at this point, the heating arrangement can respond very rapidly. Consequently, the plate 8 may be disposed adjacent to or may form the outlet plate 6, or a part thereof.

Figure 3:
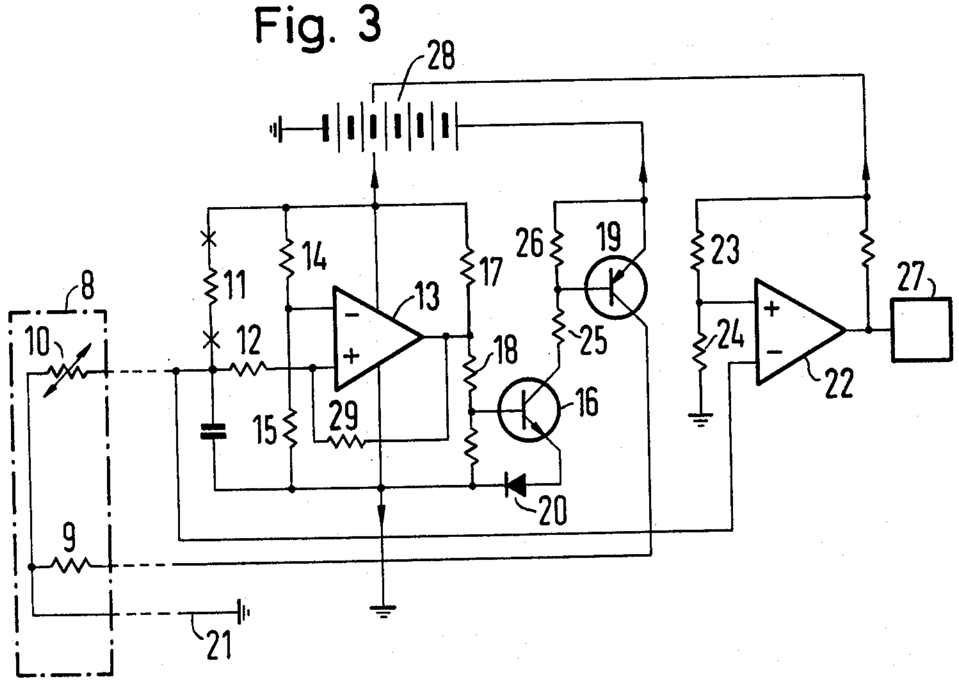
FIG. 3 is a schematic diagram of a circuit arrangement for controlling the temperature of the recording head.

Regulation of the heating arrangement is effected by means of a circuit arrangement such as illustrated in FIG. 3, which includes the thermistor 10, functioning as a temperature sensor, and which remains in thermal contact with the heat-conducting plate 8, to be heated by the heating element 9. The circuit also includes a resistance 11 functioning as an operational standard with the electrical value thereof being so determined that it matches the electrical resistance of the thermistor 10, at the desired temperature of about 32° C., of the heat-conducting plate 8 and thus for the outlet plate 6. The resistance 11 with the thermistor 10 thus forms a voltage divider. A falling voltage at the thermistor 10 is conducted over a resistance 12 to the non-inverting input of an operational amplifier 13, the inverting input of which is supplied, over a voltage divider comprising resistances 14 and 15, with one half the operating voltage of the operational amplifier.

As long as the operational temperature, i.e. the assumed value of 32° C., for the outlet plate 6 is not attained, the resistance of the thermistor 10 remains greater than that of the standard resistor 11, and the voltage at the non-inverting input of the operational amplifier 13 is higher than that at the inverting input. Consequently, the output transistor of the operational amplifier 13 is blocked, as a result of which the following transistor 16 receives base current through resistor 17 and 18, and will therefore be conductive. The transistor 16, in turn, supplies the base current to a power transistor 19, which is coupled thereto by means of resistors 25, 26, whereby the transistor 19 likewise conducts and thus supplies the operating voltage of about 40 volts, from a suitable voltage source 28, to the heating resistance 9.

When the desired temperature has been attained, i.e. an outlet plate temperature of about 32° C., the resistance of the thermistor 10 falls below that of the standard resistor 11, as a result of which the voltage of the non-inverting input of the operational amplifier 13 becomes less than that at the inverting input thereof. The output transistor of the operational amplifier 13 thereby becomes conductive and removes the base current from transistor 16 whereby the latter, and thus transistor 19, are blocked and the heating current circuit is operationally open. In the event the temperature at the outlet plate 6 falls below the desired temperature of 32° C., the heating current will again be supplied.

The particular arrangement of the transistors 16 and 19 enables the utilization of a common return 21 from the recording head for both the thermistor 10 and the heating resistance 9. To avoid undesired control cycling, as a result of the voltage drop on the return, the output of the operational amplifier 13 is connected over a resistor 29 with the non-inverting input of the amplifier.

In addition to the control circuit for the heating element, an additional circuit arrangement is incorporated in the overall circuitry, with such additional circuit arrangement comprising an operational amplifier 22, the output of which is connected to the controller 27 for the matrix head, whereby when the device is initially turned on, the operational amplifier 22 will supply a signal blocking operational function of the head until the outlet plate 6 has reached the required temperature for the recording operation. The inverting input of such amplifier is connected to the thermistor 10 while its non-inverting input is connected to a voltage divider, comprising resistors 23 and 24 which are so dimensioned that the input voltage is about 5% greater than the voltage at the inverting input of the amplifier 13. The output transistor of the operations amplifier 22 is therefore conductive and accordingly supplies a blocking signal as long as the resistance of the thermistor 10 is greater than the resistance of the standard resistor 11, increased by 5%. Such 5% differential between the standard resistance and the effective value is utilized to insure that no blocking signal will be supplied by the operational amplifier 22 during intermittent non-heating cycles in the normal operation of the head.

As the recording head can be operated only when the outlet plate has achieved the required temperature, a particularly high level of operational reliability of the recording head can be achieved.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a heating device for the recording fluid in the recording head of a mosaic recorder containing a plurality of ink ducts terminating in outlet orifices, the combination of said orifices being disposed closely adjacent one another, a heating device disposed to concentrate the heating action closely adjacent said orifices, whereby heat is applied to ink thereat as it is about to be discharged therefrom, a circuit arrangement operatively connected to said heating device for controlling the heating action thereof upon such ink, a further circuit arrangement for preventing the operation of the recording head until the nominal operating temperature thereof has been achieved, and a temperature responsive sensor disposed in common with, and controlling the operation of both of said circuit arrangements.

2. A heating device for recording fluid in the recording head of a mosaic recorder, the combination of said head containing a plurality of ink ducts terminating in outlet orifices, which ink ducts are relatively great in length, as compared with the cross-sectional size of said orifices, the latter being disposed closely adjacent one another, a heat conducting plate which is small in size, as compared with the size of the recording head, said plate being of a size to contain the end portions of the respective ducts at said orfices, which end portions are relatively very short, as compared with the remaining length of the ducts contained in said head, and contains but a small volume of ink as compared with the total volume of ink contained in the associated duct, a heating means directly associated with said plate for heating the latter, whereby the applied heat is concentrated on the relatively small volume of ink disposed within the respective duct portions in said plate directly prior to its discharge from the head, and a circuit arrangement operatively connected to said heating means for controlling the heating action thereof on said plate and ink.

3. A device according to claim 2, wherein said circuitry includes a further circuit arrangement for preventing the operation of the recording head until the nominal operating temperature thereof has been achieved.

4. A device according to claim 2, wherein the heat-conducting plate and the recording head are in the form of a unitary structure.

5. A device according to claim 2, wherein said heating means comprises an electrical heating element, said heat-conducting plate containing said heating element and a heat sensor, responsive to the temperature of said plate, which heating element and sensor are connected to said circuit arrangement.

6. A device according to claim 5, wherein said sensor comprises a thermistor and said circuit includes a voltage divider arrangement formed by said thermistor and a standard resistor which matches the electrical resistance of the thermistor at the desired operating temperature.

7. A device according to claim 6, wherein said circuitry includes a further circuit arrangement for preventing the operation of the recording head until the nominal operating temperature thereof has been achieved.

8. In a heating device for the recording fluid in the recording head of a mosaic recorder containing a plurality of ink ducts terminating in outlet orifices, the combination of said orifices being disposed closely adjacent one another, a heating device containing a heat-conducting plate constructed of heat-conductive material, which surrounds all the outlet orifices of the ink ducts, to concentrate the heating action closely adjacent said orifices, whereby heat is applied to ink thereat as it is about to be discharged therefrom, a circuit arrangement operatively connected to said heating device for controlling the heating action thereof upon such ink, said heat-conducting plate being provided with a heating element and a heat sensor responsive to the temperature of the heating element, which heating element and sensor are connected to said circuit arrangement, said sensor comprising a thermistor and said circuit including a voltage divider arrangement formed by said thermistor and a standard resistor which matches the electrical resistance of the thermistor at the desired operating temperature, a further circuit arrangement for preventing the operation of the recording head until the nominal operating temperature thereof has been achieved, said temperature responsive sensor being common to and controlling the operation of both of said circuit arrangements.

9. A device according to claim 8, wherein the heat-conducting plate and the recording head are in the form of a unitary structure.

* * * * *